US008819141B2

(12) United States Patent
Hewes et al.

(10) Patent No.: US 8,819,141 B2
(45) Date of Patent: Aug. 26, 2014

(54) CENTRALIZED MOBILE AND WIRELESS MESSAGING OPT-OUT REGISTRY SYSTEM AND METHOD

(75) Inventors: Gerald Hewes, Lexington, MA (US); Boon Hwang, San Rafael, CA (US); Michael Pirie, Redmond, WA (US); Randall Snyder, Las Vegas, NV (US)

(73) Assignee: Syniverse ICX Corporation, Tampa, FL (US)

( * ) Notice: Subject to any disclaimer, the term of this patent is extended or adjusted under 35 U.S.C. 154(b) by 1845 days.

(21) Appl. No.: 10/556,977

(22) PCT Filed: May 17, 2004

(86) PCT No.: PCT/US2004/015433
§ 371 (c)(1),
(2), (4) Date: Oct. 10, 2007

(87) PCT Pub. No.: WO2004/104851
PCT Pub. Date: Dec. 2, 2004

(65) Prior Publication Data
US 2008/0114884 A1 May 15, 2008

Related U.S. Application Data

(60) Provisional application No. 60/471,384, filed on May 16, 2003.

(51) Int. Cl.
*G06F 15/16* (2006.01)
(52) U.S. Cl.
USPC ............................. 709/206; 709/205; 709/219
(58) Field of Classification Search
CPC ....... H04L 12/585; H04L 51/12; H04L 29/06; H04L 12/5895; H04L 69/329; H04L 67/2842
USPC .................. 709/227–229, 207, 206, 205, 219
See application file for complete search history.

(56) References Cited

U.S. PATENT DOCUMENTS

| 5,903,726 | A | 5/1999 | Donovan et al. | |
|---|---|---|---|---|
| 6,330,317 | B1 * | 12/2001 | Garfinkel | 379/196 |
| 6,711,242 | B2 | 3/2004 | White et al. | |
| 6,721,784 | B1 | 4/2004 | Leonard et al. | |
| 6,732,185 | B1 | 5/2004 | Reistad | |
| 6,910,117 | B2 * | 6/2005 | Shieh | 711/206 |
| 2002/0010759 | A1 * | 1/2002 | Hitson et al. | 709/219 |
| 2003/0083078 | A1 * | 5/2003 | Allison et al. | 455/466 |
| 2004/0181591 | A1 * | 9/2004 | Yu et al. | 709/217 |

OTHER PUBLICATIONS

PCT/US04/15433, International Search Report and Written Opinion, Date of Mailing Oct. 13, 2004, 8 pages.
PCT/US04/15433, International Preliminary Report on Patentability, Date of Issuance Nov. 18, 2005, 4 pages.
Canadian Patent Application No. 2,526,178, Office Action, Dated Aug. 14, 2012, 3 pages.
Canadian Patent Application No. 2,526,178, Office Action, Dated Aug. 19, 2013, 7 pages.

\* cited by examiner

*Primary Examiner* — Thai Nguyen
(74) *Attorney, Agent, or Firm* — HIPLegal LLP; Judith A. Szepesi (57) ABSTRACT

Provided herein is a centralized registry service enabling subscribers to "opt-out" of any or all mobile messaging programs. The registry service supports access to storage medium information by mobile and wireless carriers, companies operating mobile messaging programs, mobile applications or platforms, and most importantly, individual subscribers. The registry service can be used with any message based network, including non mobile networks.

43 Claims, 9 Drawing Sheets

CENTRALIZED MOBILE AND WIRELESS MESSAGING OPT-OUT REGISTRY SYSTEM AND METHOD

CROSS-REFERENCE TO RELATED APPLICATIONS

This application claims the benefit of priority to U.S. Application No. 60/471,384, filed May 16, 2003, the entire disclosure of which is hereby incorporated by reference as if set forth at length herein.

STATEMENT REGARDING FEDERALLY SPONSORED RESEARCH OR DEVELOPMENT

Not applicable

REFERENCE OF A "MICROFICHE APPENDIX"

Not applicable

FIELD OF THE INVENTION

This invention relates to messaging systems and services and more particularly to a system, method, machine and product for managing a messaging opt-out registry for mobile and wireless messaging services.

BACKGROUND OF THE INVENTION

Mobile messaging encompasses many technologies, including short message services (SMS), multimedia message service (MMS), wireless web-based messaging, wap-based messaging, instant messaging and others. Mobile messaging applications take many forms, such as mobile marketing for branded promotions, information services, entertainment services and a variety of business applications. The wireless data channel provides messaging application service providers with a tremendous opportunity to communicate with subscribers in a time-sensitive and event-sensitive way.

Unfortunately, the rapid growth of mobile messaging and mobile messaging application services also creates potential abuses in the form of unsolicited, undesirable or unwanted information, i.e. spam. Traditional direct marketing, telemarketing and e-mail marketing all experience some form of negative backlash due to the sending of spam to addressees.

SUMMARY OF THE INVENTION

Provided herein is a messaging opt-out registry that can be used for all messaging applications and platforms. Specifically, the messaging opt-out registry of the present invention can be made available to all wireless subscribers that are the target of mobile messaging programs. And more specifically, the messaging opt-out registry could be a single national messaging opt-out registry. The messaging opt-out registry allows any wireless or mobile subscriber to enroll their mobile directory number in a database through the Internet or through their wireless device. The messaging opt-out registry is queried by messaging application providers prior to the sending of any mobile message to subscribers, thereby preventing them from receiving undesired messages.

To avoid undesirable messages in a mobile or wireless environment, a messaging opt-out registry service can be deployed. This service affords subscribers the ability to explicitly "opt-out" of messaging applications at any time. Subscriber opt-out status data is maintained in the messaging opt-out registry that is used to provide opt-out information to application service providers prior to the sending of any mobile-terminated message. If a subscriber has chosen not to receive all, or certain types of messages, they are not sent.

A centralized nationwide registry service enabling subscribers to "opt-out" of any or all mobile messaging programs can be implemented. This registry service supports access to database information by wireless carriers, companies operating mobile messaging programs, mobile applications or platforms, and most importantly, individual subscribers.

This web site access can be provided by a nationally accredited service or industry trade association. Or, individual carriers can provide this service to their subscribers via the carrier's wireless or desktop portals.

DETAILED DESCRIPTION OF THE INVENTION

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

In this invention, we alternatively refer to wireless or mobile devices, and wireless or mobile messaging. In the context of this invention, these are considered equivalent and this application applies to both. In reality, there are mobile devices that are not wireless, and wireless devices that are not mobile, but this distinction does not matter for the purpose of this invention, it applies to all these devices or messaging applications.

Figure 1:
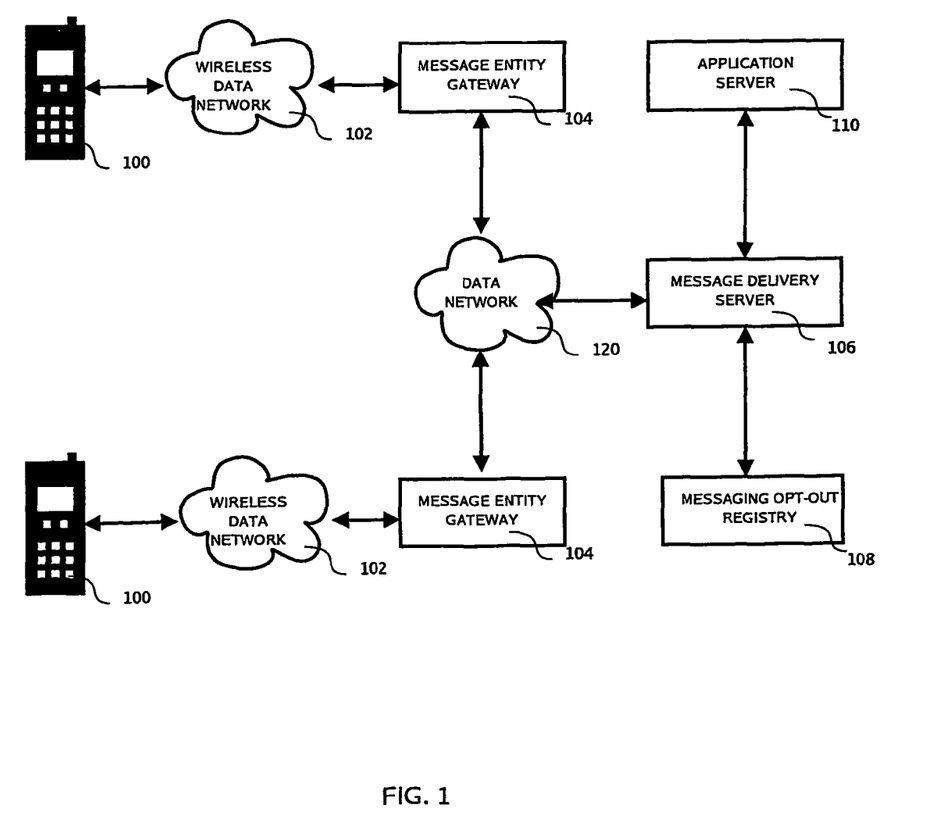
FIG. 1 Exemplary high-level architecture for a messaging opt-out registry.

Referring to FIG. 1, an exemplary system illustrating the delivery components of this invention and constructed in accordance with the teachings expressed herein comprises the following components: wireless devices (100); wireless data networks (104); message entity gateways (104); a data network (120); message delivery servers (106); a messaging opt-out registry (108); application servers (110).

Mobile messaging programs can be abused when they have the ability to send any message to any wireless subscribers. Subscribers may perceive some messages as a nuisance. The idea is to perform mobile messaging programs among wireless subscribers who have voluntarily "opted-in" to these programs. The basic idea of the messaging opt-out registry (108) is to prevent message application providers from sending unsolicited mobile-terminated messages to wireless subscribers. This can be done by checking a list of mobile directory numbers (i.e., the phone number of the wireless subscriber used as the address for mobile-terminated messages) or addresses, prior to the sending of the messages for a particular messaging program. The messaging opt-out registry (108) affects all mobile messaging application providers planning to run wireless message-based programs.

Before any mobile-terminated message is sent to any subscriber wireless device (100), a mobile messaging application running on an application server (110) is required to know the opt-out status for the subscriber wireless device (100). If the subscriber wireless device (100) is listed, messages would not be sent to that subscriber, based on specifically chosen preferences. The messaging opt-out registry (108) maintains these opt-out preferences for each wireless device enrolled.

In one exemplary embodiment, the application server (110) delivers message to wireless devices (100) by means of a message delivery server (106). The message delivery server (106) is programmed to check the wireless devices (100) opt-out status for this particular program with the messaging opt-out registry (108). If the wireless device (100) is not marked as opt-out, the message is then routed to the appropriate wireless network by means of a data network (120) between the message delivery server (106) and the wireless network message entity gateway (104). Once the message is received by the messaging entity gateway (104), the wireless carrier delivers the message to the wireless device (100) by means of wireless data network (102).

In an alternative embodiment, the application server (110) can directly check the opt-out status of the wireless device (100) with the messaging opt-out registry (108).

In one exemplary embodiment, the protocol used between the application server (110) and the message delivery server (106) is the Short Message Peer to Peer (SMPP) protocol. In one exemplary embodiment the protocol used between the message delivery server (106) and the message entity gateway (104) is the Short Message Peer to Peer (SMPP) protocol.

In one embodiment, all mobile terminated messages are checked for opt-out status.

In one embodiment, only the first message of an application initiating contact is checked for opt-out status. Application server (110) responses to a mobile originated message are not checked for opt-out status.

In one exemplary embodiment, the message delivery server (106) is centralized, and all message traffic goes through it. The message delivery server (106) can enforce the opt-out rules since all messages flow through it.

In one exemplary embodiment, the message delivery server (106) is decentralized, and a plurality of message delivery servers (106) is supported. These may be operated by different organizations, including wireless carriers, message aggregators or mobile messaging application providers. The communication between the message delivery servers (106) and the messaging opt-out registry is done by means of a data network and a mutually agreed upon protocol.

The decentralized embodiment of message delivery servers (106) is possible because mobile messaging application providers that violate the rules of the messaging opt-out registry (108) are easily detected and can be disallowed from sending any messages to subscribers. Mobile messaging programs are fundamentally different than e-mail marketing or telemarketing. For mobile messaging applications or platforms to have access to wireless carriers' networks, they require dedicated connections to these carriers. These are not public connections in the way that e-mail gateways are public. The entities sending messages to wireless subscribers are always known by the centralized servers that connect to the wireless carriers. There are typically contractual obligations for mobile messaging application providers connecting to wireless carriers either directly or indirectly. Monitoring and detection of unsolicited messages is possible and the application platforms can be prohibited from sending any messages. It is generally in the best interest for companies with name or brand recognition to refrain from sending unsolicited mobile messages to their customer base, since they do not wish to upset them. Notice that the typical e-mail "spam" received by subscribers today is generally not from well-known branded companies, as these companies do not wish to drive their existing customers away.

In one exemplary embodiment, the messaging opt-out registry (108) is a secure service that is accessible via well-defined and standard protocols, such as the short message peer-to-peer (SMPP) protocol, the hypertext transport protocol (HTTP) and the Simple Object Access Protocol (SOAP).

In one exemplary embodiment, the messaging opt-out registry (108) has exceptions that are designed in. That is, the ability to modify or override the opt-out statuses of subscribers for particular reasons. An example would be a wireless carrier contacting its own customer (subscriber) base. In many cases, messages received by subscribers from their own carriers are not perceived as a nuisance; rather they are viewed as informational messages. Also, wireless carriers typically keep these unsolicited messages to a minimum, so as not to be a nuisance to subscribers.

Figure 2:
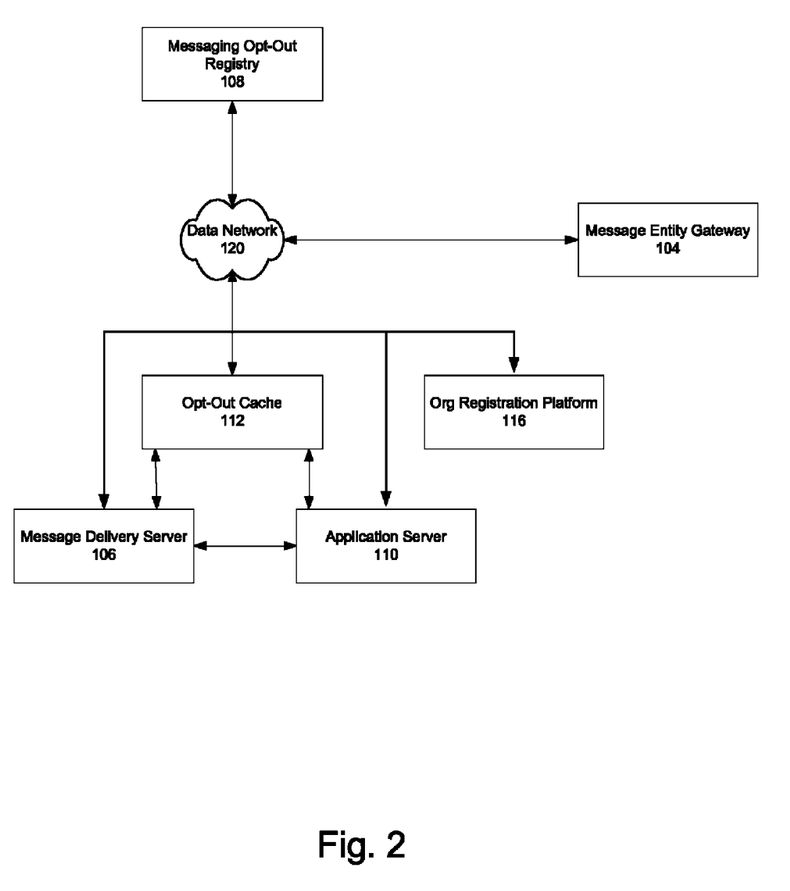
FIG. 2 Exemplary high-level architecture for a messaging opt-out registry focused on the messaging application provider systems.

Referring to FIG. 2, an exemplary system illustrating the messaging application provider centric delivery components of this invention and constructed in accordance with the teachings expressed herein further comprises the following components: a data network (114), an opt-out cache (112) and an organization registration platform (116). The opt-out cache (112), the organization registration platform (116), the message delivery server (106), and the application server (110) being connected to the messaging opt-out registry (108) by means of a data network (114). The message delivery platform being connected to a plurality of message entity gateways (104) by means of the data network (114).

In one exemplary embodiment, the application server (110), before pushing out message, first checks the opt-out cache (112) for mobile directory numbers and addresses in its list. For the mobile directory numbers and addresses not in the opt-out cache (112), the application server (110) submits a list of mobile directory numbers and addresses to the messaging opt-out registry (108). The messaging opt-out registry (108) then performs a scan against the opt-out registry database (124). A report is then provided back to the messaging application (110) specifying which of the subscriber mobile directory numbers and addresses should not be contacted. In one exemplary embodiment, the result of the scan is stored in the opt-out cache (112).

In one exemplary embodiment, relevant portions of the messaging opt-out registry (108) database is securely downloaded periodically into the opt-out cache (112) by mobile messaging application providers and compared to their subscriber database lists for messaging programs.

This enables mobile messaging applications to use a sanitized list of mobile directory numbers and addresses so that information is not sent to subscribers who have chosen to opt-out.

In one exemplary embodiment, the message delivery server (106), or the application server (110) queries every mobile directory number or address prior to sending a message. If an entry is found in the opt-out cache (112), it is used, otherwise a real-time query is made to the messaging opt-out registry (108), the result is stored in the opt-out cache (112) and used by the messaging application. This exemplary embodiment enables a more desirable method for querying the cached database in real-time while an active program is running. This avoids many of the performance problems associated with querying a live centralized database in real-time.

In one exemplary embodiment, entries in the opt-out cache (112) are cached only for a certain period of time.

In one exemplary embodiment, the message application provider does not include the opt-out cache (112).

In one exemplary implementation, the organization registration platform (116) is used to communicate and register the organization program categories with the messaging opt-out registry (108). The program categories, organization ownership and other registration attributed may be used by the messaging opt-ut registry (108) in its decision to allow for the sending of a message to particular mobile directory number or address.

Figure 3:
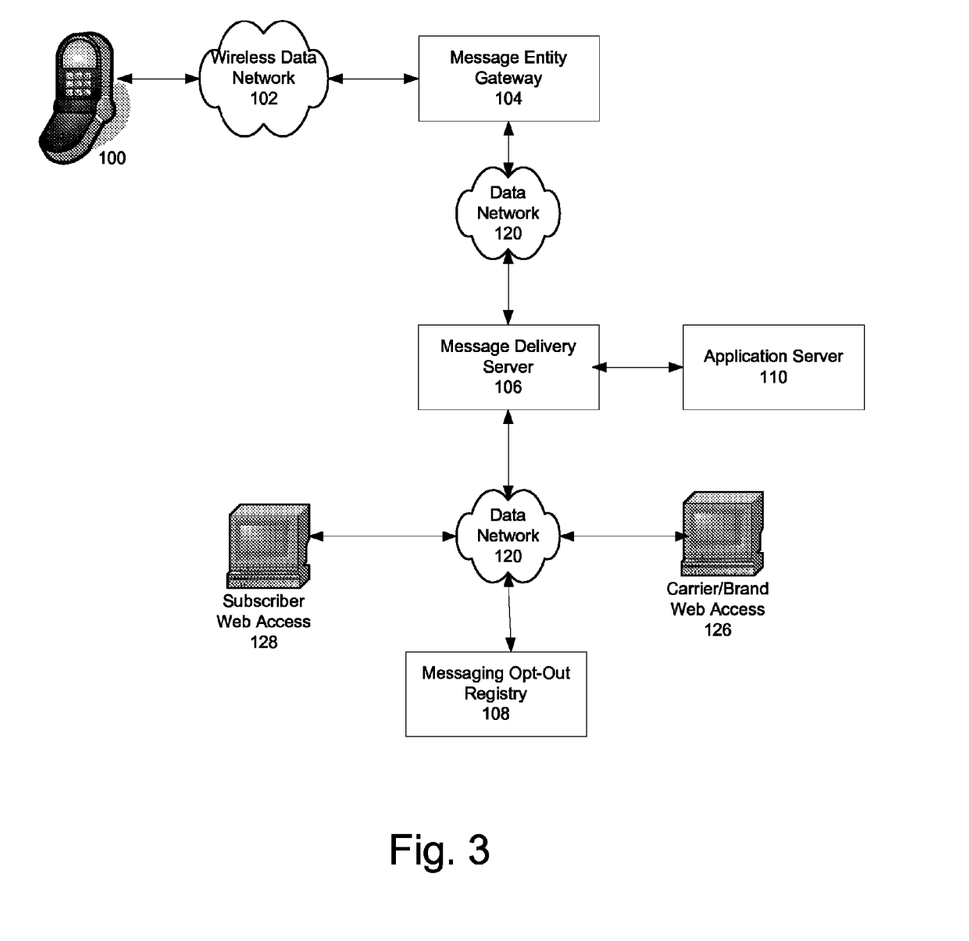
FIG. 3 Exemplary high-level architecture for a messaging opt-out registry

Referring to FIG. 3, an exemplary system illustrating the messaging opt-out registry centric components of this invention and constructed in accordance with the teachings expressed herein further comprises the following components: Subscriber web access (128) and carrier and brand web access (126).

In one exemplary embodiment, a dedicated, automated and secure application program interface (API) would provide messaging opt-out registry information to mobile messaging application platforms and wireless carriers. The API can be used to query opt-out status for mobile directory numbers and addresses. The API can be used to submit and retrieve opt-out status for batches of mobile directory numbers and addresses. The API can be use by wireless carriers to update and query their subscriber opt-out status. The API can be used to register new messaging programs, edit existing messaging programs, query existing or past messaging programs.

In one exemplary embodiment, the messaging opt-out registry (108) provides access to the registry database by the following entities: wireless carriers, mobile messaging application providers, companies using mobile messaging applications for programs, and subscribers. Wireless carriers may require access to the messaging opt-out registry database (108) to obtain and potentially change the opt-out statuses of stored mobile directory numbers. This is due to the turnover of these numbers by subscribers who may no longer be affiliated with a particular carrier.

In one exemplary embodiment, as a default, a subscriber's device mobile directory number might not be in the messaging opt-out registry (108) database unless that subscriber explicitly enters it and chooses individual opt-out preferences. The subscriber's device mobile directory number would stay in the messaging opt-out registry (108) for a predefined period of time, for example one year since the last access, or until the mobile directory number is no longer valid for that subscriber. Wireless carriers would notify the messaging opt-out registry (108) when a mobile directory number is no longer used by a subscriber and is not being ported to another wireless carrier. This allows the number to be used by a new subscriber who would subsequently enroll their opt-out preferences, if desired.

In one exemplary embodiment, subscribers can periodically be sent a reminder message to their mobile directory number or address to remind them of their opt-out status, in case they have forgotten or wish to change their opt-out preferences.

In one exemplary embodiment, wireless carriers have access to the service via a secure hypertext transport protocol (HTTP) connection over the public Internet or a private intranet. A more appropriate means of access might be a specialized management application program interface (API) provided to the carrier. This access would enable carriers to modify the statuses of mobile directory numbers (e.g., removing an entry when a number is no longer used by a subscriber), or obtain statistics and perform reporting.

Figure 4:
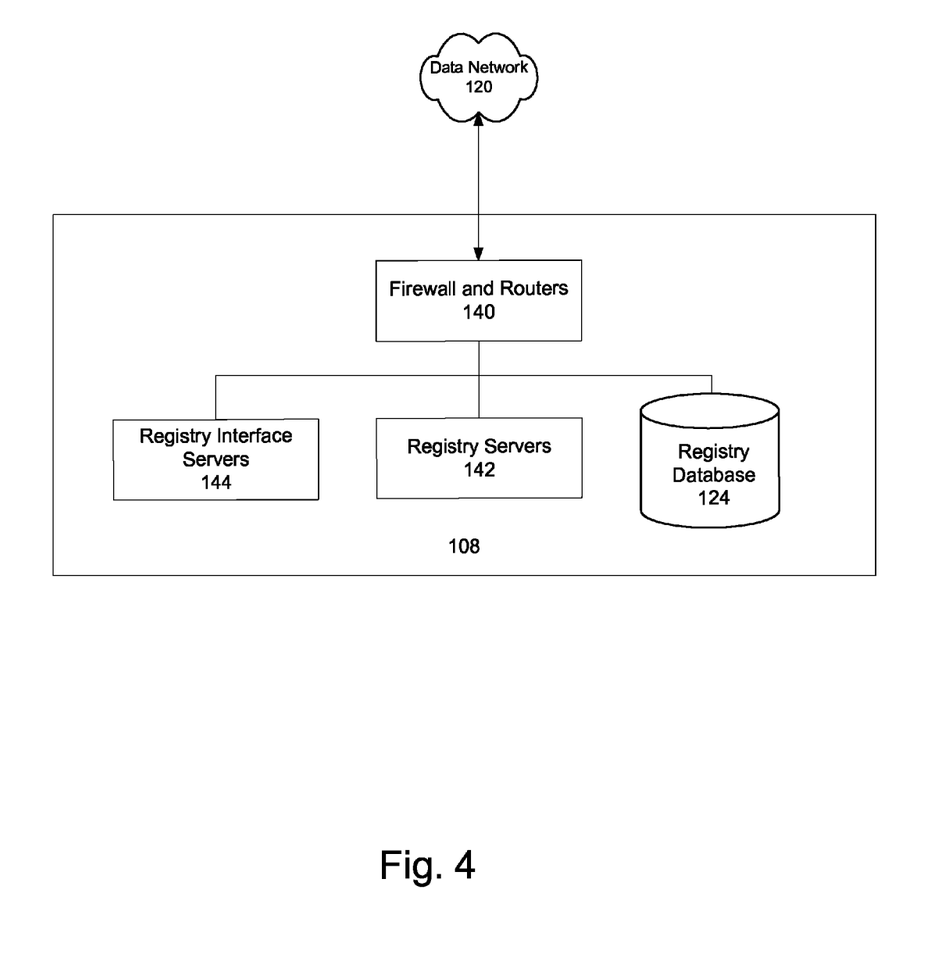
FIG. 4 Exemplary detailed architecture for a messaging opt-out registry

In one exemplary embodiment, wireless carriers have direct access to the messaging opt-out registry (108). Wireless carriers can modify the status of a subscriber in the registry database (124). Wireless carriers have a need to modify the status of subscribers in the registry database (124) directly. Subscribers could potentially have problems enrolling with the service or modifying opt-out statuses themselves. In this case, it is likely they would call their carrier's customer service department and request assistance. Another reason may be that the carrier has deployed a new application service, requiring a change of status to enable subscribers to receive certain messages. Or, the carrier wishes to override certain opt-out statuses to broadcast messages to their own subscriber base. Wireless carriers have a need to delete a mobile directory number from the registry database (124). Mobile directory numbers will have to be deleted from the registry database (124) periodically, as subscribers discontinue their subscriptions with a given carrier. In this case, the mobile directory numbers of these subscribers are surrendered back to the carrier for assignment to new subscribers. These new subscribers with previously used mobile directory numbers could then re-enroll in the registry with new opt-out preferences if they desire.

In one exemplary embodiment, service administrators have access to the registry database (124). The registry database (124) can be manually updated, reports can be generated, and the server and database can be operationally maintained via an API-based maintenance interface.

In one exemplary embodiment, wireless subscribers have access to the service via a secure HTTP connection over the public Internet. This access would enable any wireless subscriber to update their individual opt-out status via a hosted web site. The messaging opt-out registry (108) would also support provisions for subscribers to update their individual statuses via their mobile devices, using either a messaging protocol like SMS or via wireless web access.

Wireless subscribers should be able to easily access the opt-out registry service to update their desired statuses. There are two primary embodiments that enable this access.

In one exemplary embodiment, subscribers are able to access the opt-out registry service via a secure public desktop or wireless web site.

In one exemplary embodiment, subscribers are able to access the opt-out registry service via a wireless device using a variety of messaging services or wireless web services, e.g., SMS, multimedia message services (MMS), wireless application protocol (WAP), etc.

Figure 6:
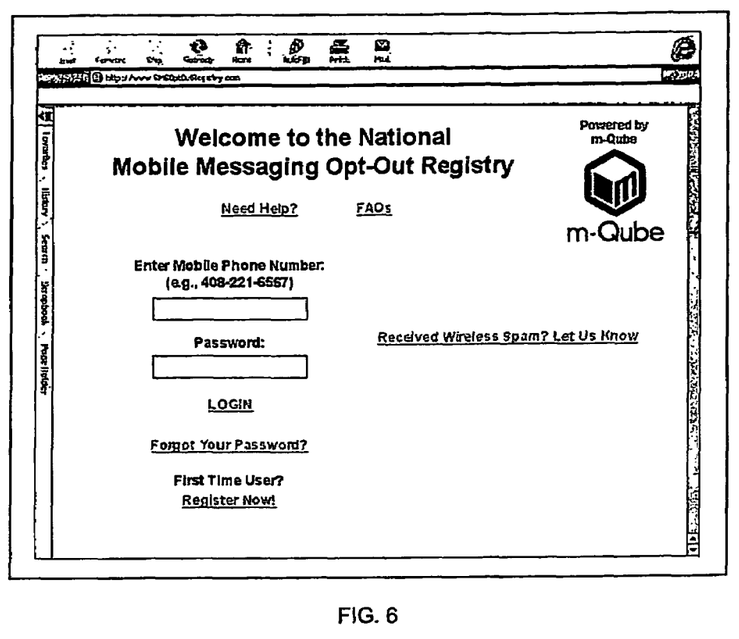

FIG. 6 illustrates an exemplary embodiment of a web site page where wireless subscribers can enroll their mobile phone directory number in the messaging opt-out registry (108). To enroll in the messaging opt-out registry (108) via the web site, subscribers would register by entering their mobile directory number (e.g., mobile identification number (MIN) for Code Division Multiple Access (CDMA) networks and Mobile Subscriber ISDN Number (MSISDN) for Global System for Mobile Communication (GSM) networks) and a password. It is possible that a subscriber may receive unwanted messages (i.e., spam), even though they have enrolled in the registry.

Therefore, functionality would be developed to allow these subscribers to report these unwanted messages so that they can be prevented.

Subscribers could potentially opt-out of messaging services at a variety of levels, such as: messages from all programs; messages from individual industries or organizational categories; messages from individual organizations or companies; and messages from individual programs.

Figure 7:
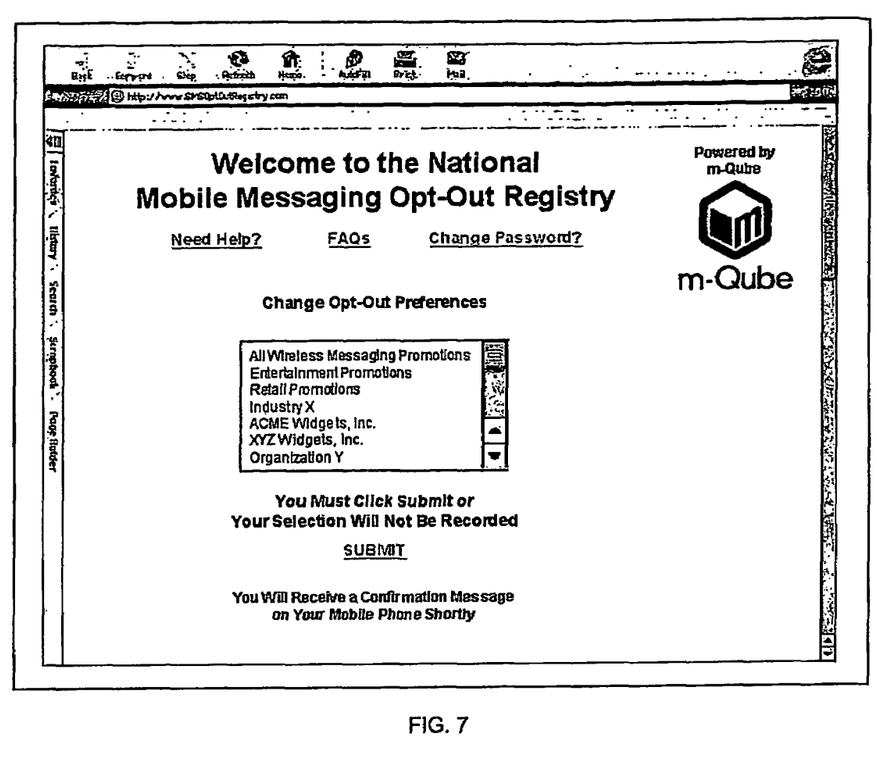

FIG. 7 illustrates an exemplary embodiment of the options a wireless subscriber might have when enrolling in the messaging opt-out registry (108).

Figure 8:
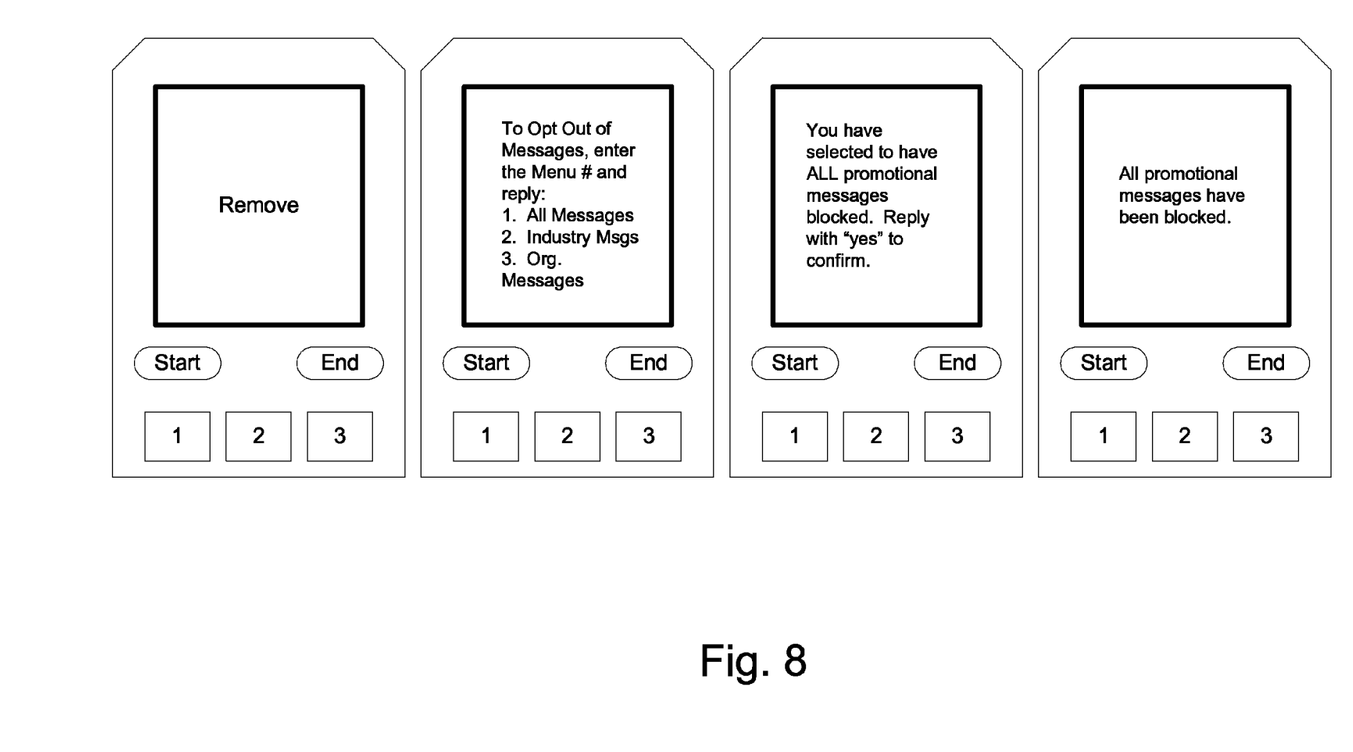
Figure 9:
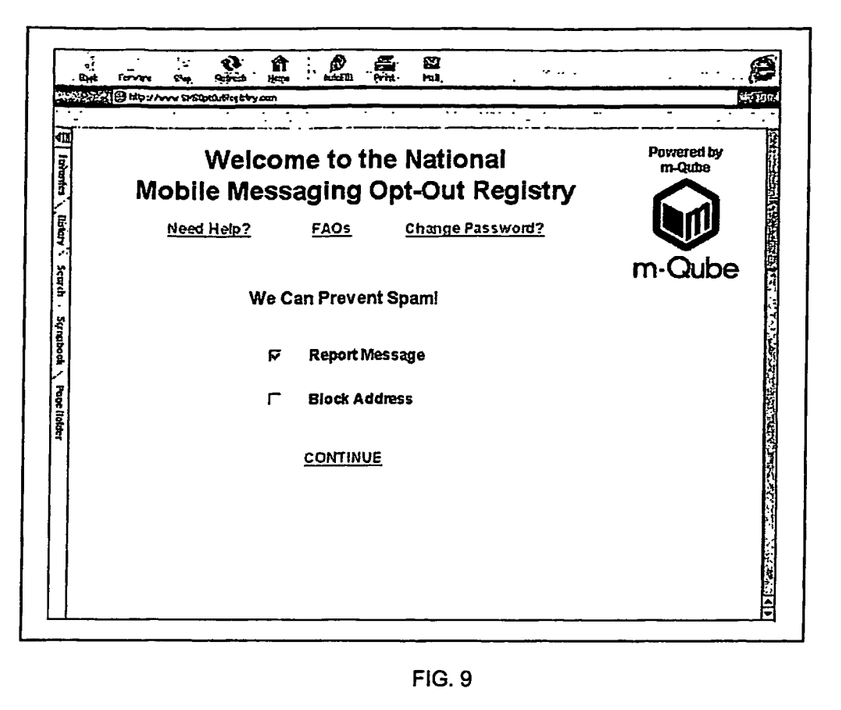

FIG. 8 illustrates an exemplary embodiment of a sample mobile phone interface using SMS that would enable subscribers to enroll in the messaging opt-out registry (108).

In one exemplary embodiment, access to the registry using SMS is enabled by means of a standardized national opt-out short code address. The opt-out short code address could provide dedicated access to the messaging opt-out registry (108) for a subscriber to update opt-out preferences. Subscribers could send a mobile-originated message to this address with a known or standardized message such as "Remove." When the message is received by the messaging opt-out registry (108), a dialog may invoked where a subscriber can enroll with the same type preferences available through the public web site.

In one exemplary embodiment, subscribers could "opt-back-in" to one or more mobile messaging application programs after they have opted-out. Subscribers could do this by changing their opt-out preferences to a menu item specifying "None," or to modify an organizational category or individual organization.

Referring to FIG. 4, an exemplary system illustrating the messaging opt-out registry components of this invention and constructed in accordance with the teachings expressed herein comprises the following components: a registry database (124), a plurality of registry servers (142), a plurality of registry interface servers (144), a system of firewalls and routers (140).

In one exemplary embodiment, the messaging opt-out registry (108) maintains a registry database (124) of wireless subscriber information. The registry database (124) includes a record for each enrolled mobile device, using the mobile directory number or address as the key record identifier. Each record contains at a minimum the following information: mobile directory number or address; time and date stamp (i.e., when the number was enrolled or last updated in the registry database (124)), opt-out options, for example, preferences for levels of opting-out, such as all mobile messaging programs, messaging programs for a particular industry or only messages belonging to specific industry organizations. The registry database (124) is used to determine which wireless subscribers have opted-out of mobile messaging programs.

In one exemplary embodiment, the present invention contains systems and methods to secure from external tampering the messaging opt-out registry (108). The registry database (124) information should be secured due to privacy concerns among wireless carriers, mobile messaging application providers and subscribers. The following list provides exemplary characteristics for secure access to the registry: use of standard security protocols such as secure socket layer (SSL) or transport layer security (TLS); database protection via secure partitioning by wireless carrier; database record encryption (and possibly encryption-key encryption); user name and encrypted password access for subscribers; multiple level application access that can be provisioned as read-only or read/write for specific information in the database.

The employed security mechanism should provide protection against at least the following threats: rogue service administrators; external hackers; protection against persons enrolling false mobile directory numbers or other subscribers' numbers. Security is automatically built-in to the architecture since mobile messaging application providers accessing the service should always be known entities connected via secure provisioned APIS. Also, there would be no public access to the message delivery servers (106) as they would use dedicated connections to the wireless carriers that are inaccessible to all but known and directly connected applications.

In one exemplary embodiment, API access to the messaging opt-out registry (108) is provided by a plurality of registry servers (142). These can be further programmed to carry out any automatic activity required by the messaging opt-out registry (108).

In one exemplary embodiment, web, wap and messaging user interface for the messaging opt-out registry (108) is provided by registry interface servers (144).

Figure 5:
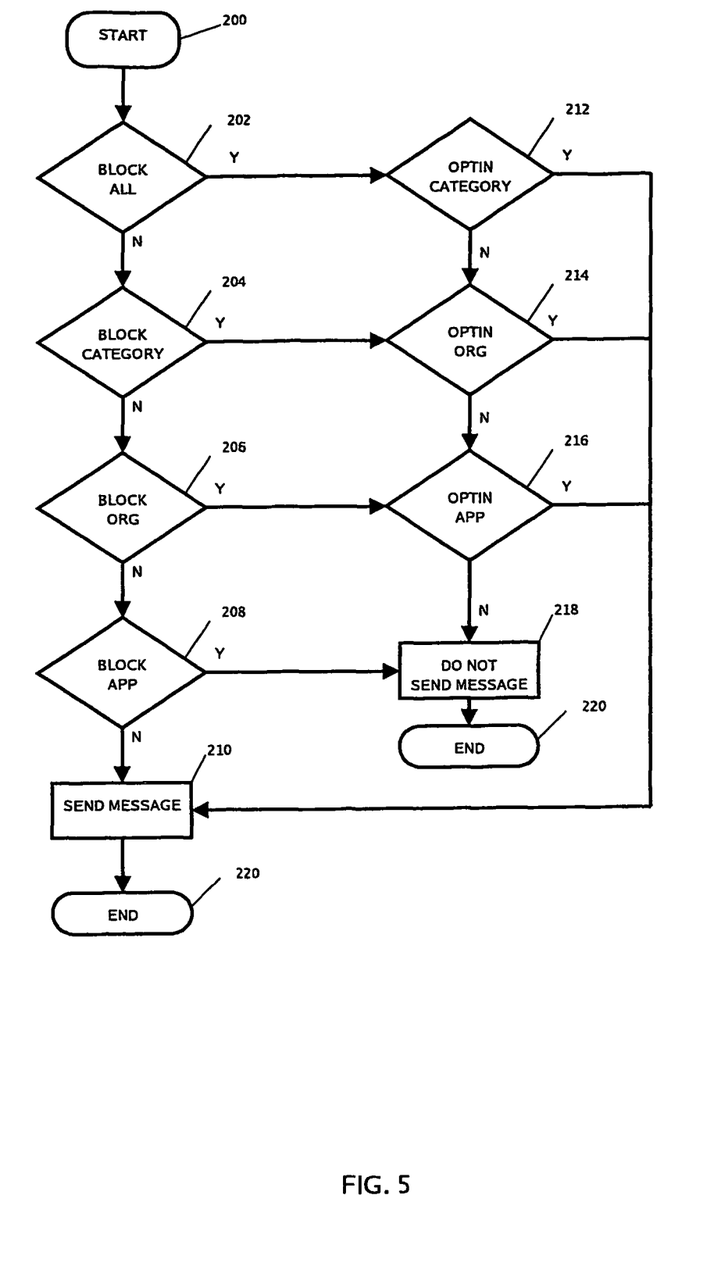
FIG. 5 Exemplary flow chart checking opt-out status by a message delivery server FIG. 6 Exemplary subscriber web site for enrolling mobile phone numbers FIG. 7 Exemplary mobile messaging opt-out options for subscribers FIG. 8 Exemplary mobile device user interface for enrolling mobile phone numbers FIG. 9 Exemplary spam prevention options

Referring to FIG. 5, there is shown a flow chart of an exemplary embodiment of the logic the messaging opt-out registry (108) can be programmed to decide on whether a message should be delivered to a mobile device number or address for a given messaging application. The logic starts at step 200. In step 202, the messaging opt-out registry (108) checks if the mobile directory number or address status is set to block all messages. If no it proceeds to step 204, otherwise to step 212. In step 204, the messaging opt-out registry (108) checks if the mobile directory number or address status is set to block message from the messaging application category. If no it proceeds to step 206, otherwise to step 214. In step 206, the messaging opt-out registry (108) checks if the mobile directory number or address status is set to block message from the messaging application organization. If no it proceeds to step 208, otherwise to step 216. In step 208, the messaging opt-out registry (108) checks if the mobile directory number or address status is set to block message from the messaging application. If no it proceeds to step 210, otherwise to step 218. Step 210 allows the message to be sent. Step 218, forbids the message to be delivered. In step 212, the messaging opt-out registry (108) checks if the mobile directory number or address status explicitly allows (opt-in) traffic from the messaging application category. If yes, it processed to step 210, otherwise to step 214. In step 214, the messaging opt-out registry (108) checks if the mobile directory number or address status explicitly allows (opt-in) traffic from the messaging application organization. If yes, it processed to step 210, otherwise to step 216. In step 216, the messaging opt-out registry (108) checks if the mobile directory number or address status explicitly allows (opt-in) traffic from the messaging application. If yes, it processed to step 210, otherwise to step 218.

In one exemplary embodiment, the opt-out preferences includes status indicating not to send any messages at all to the mobile directory number address. In one exemplary embodiment, the opt-out preferences includes status indicating not to send any messages about organizational category "X" (e.g., entertainment industry) to the mobile directory number address. In one exemplary embodiment, the opt-out preferences includes status indicating not to send any messages about organization "Y" (e.g., an entertainment company) to the mobile directory number address. In one exemplary embodiment, the opt-out preferences includes status indicating not to send any messages to a specific messaging application.

In one exemplary embodiment, subscribers can choose to opt-in to individual programs that are run by an organization. These subscribers should be allowed to do this, even after specifying their opt-out status. If there is a conflict between a subscriber's previously obtained opt-out status and a newer opt-in status for the same subscriber, that subscriber should be able to receive the appropriate messages based on the newer opt-in status. One method for allowing this is to compare a time-stamp in the opt-out registry for that subscriber with a time-stamp for a subsequent and newer opt-in status for that subscriber. Since the subscriber's opt-in has occurred after the opt-out, the opt-out status should be overridden for that given application or program so the subscriber can participate. This status should probably stay status quo until the subscriber modifies opt-out status and preferences at a later time. If a situation like this occurs, some form of reconciliation needs to occur between the new opt-in status for an organization, application or program and the opt-out status maintained in the opt-out registry database. This can be performed either manually or automatically via APIs from the management console or directly between the application platform and the opt-out registry server.

Subscribers can potentially receive wireless spam messages even though they have enrolled and opted-out through the messaging opt-out registry (108). This could be due to rogue application platforms that ignore the messaging opt-out registry (108) preferences for subscribers. There are methods of preventing unwanted messages; however, this can be more effectively enforced if the messaging opt-out registry (108) operates in conjunction with a centralized message delivery server (106).

In one exemplary implementation, wireless message spam is managed by means of proactive detection methods. These are methods where unwanted messages are intercepted before they are received by a subscriber.

Proactive spam detection methods are preferable to reactive methods but they are very difficult to implement. However, proactive prevention against the more common methods used to send unwanted messages can be implemented: The messaging opt-out registry (108) can be programmed to detect digit cycling of mobile directory numbers from an originating source. Automated application servers intending to send wireless spam to subscribers sometimes numerically cycle through mobile directory numbers. This cycling can also be detected by the message delivery servers (106) and delivery of these messages can be prevented. The message delivery servers (106) can control the rate of mobile-terminated messages sent to subscribers.

Too many messages sent to the same subscriber during a defined time period may be an indication of spam. Application servers attempting to send messages at a rate greater than a defined limit can be detected. Many message rates can be defined for multiple types of messages, such as those belonging to the same application type, or those emanating from the same source address. The message delivery server (106) can always require explicit opt-in for individual applications or types of messaging promotions.

In addition to checking the explicit opt-out status for a subscriber, applications can be required to check for an explicit opt-in status for subscribers. This would ensure that only subscribers who have opted-in to receive certain types of messages will receive them. Screening of valid originating addresses for all messages. The centralized message delivery server (106) can perform screening on the originating address of messages emanating from any application platform. Any originating message containing an address that is not on the "allowed list" can be prevented from arriving at it's destination.

In one exemplary embodiment, content filtering is implement in the message delivery servers (106). This can be effective since some of the most common, and most unwanted spam messages easy to recognize words.

In one exemplary embodiment, wireless message spam is managed by reactive detection methods. These are methods where unwanted messages are intercepted after they are received by a subscriber.

Reactive spam detection methods are easier to implement, but have the undesired effect of having subscribers receive unwanted messages before they are prevented. Reactive methods used to prevent unwanted messages can be implemented: Unwanted messages can be reported to the opt-out registry service administrator. A web site user interface can be provided that allows subscribers to report the reception of wireless spam. Information about the message would be required such as the source address received by a subscriber and possibly specific message content. Any messages containing this content or address can be investigated and prevented if necessary. Unwanted messages can be explicitly blocked by the messaging opt-out registry (108) administrator. A web site user interface can be provided that allows subscribers to request that messages be blocked from certain addresses. The delivery server can add these addresses to the subscriber's opt-out database record thereby preventing them from being subsequently received.

FIG. 8 illustrates an exemplary embodiment of a web site with the options a wireless subscriber might have to help report and prevent unwanted wireless messages.

CONCLUSION

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware, or software running on appropriate hardware, such as, for example, the Dell™ PowerEdge 1750 Intel Xeon systems, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language such as Java, to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of restricting content delivery from a content provider to a subscriber wireless device; comprising:
   storing opt-out status information for content associated with said content provider and said subscriber wireless device in an opt-out database, the opt-out status information comprising one or more of: blocking all messages except those in opt-in content categories and blocking messages in opt-out content categories;
   querying said opt-out database for said opt-out status information along with opt-out status information for a plurality of other subscriber wireless devices in a batch query;
   determining if
   a) said subscriber wireless device has opted out all content;
   b) said subscriber wireless device has opted out of content from said content provider; and
   c) said subscriber wireless device has opted to receive messages for an application from said content provider;
   determining a type of message for content delivery from said content provider to said subscriber wireless device, wherein the type of message is one of a plurality of formats of mobile messaging available on the subscriber wireless device;
   and restricting the content delivery from said content provider to said subscriber wireless device based on said opt-out status information and the type of message, by not delivering a message when the message falls within the opt-out content category, or by delivering a message when the message falls within the opt-in content category.

2. The method of claim 1 further comprising overriding said opt-out status information to enable said content provider to deliver content provider informational message content to said subscriber wireless device.

3. The method of claim 1, wherein said opt-out status comprises preferences of opt-out content categories and wherein said content delivery from said content provider to said subscriber wireless device is restricted based on said opt-out content categories.

4. The method of claim 3 wherein said opt-out content categories include "none", "opt-out of all applications", "opt-out of certain applications", "opt-out of all content providers", "opt-out of certain content providers".

5. The method of claim 1, further comprising periodically notifying said subscriber wireless device of said stored opt-out status information.

6. The method of claim 1, further comprising generating statistics and reports based on said opt-out status information.

7. The method of claim 1, further comprising modifying said opt-out status information via said content provider or said wireless device.

8. The method of claim 1, further comprising provided secure access to said opt-out storage medium via said content provider or said wireless device.

9. The method of claim 1, wherein the querying only occurs when the content delivery is an initial content delivery from the content provider to the wireless subscriber device.

10. The method of claim 9, further comprises caching the opt-out status retrieved from the opt-out storage medium in a cache, for subsequent queries.

11. A method of restricting content delivery from a content provider to a subscriber wireless device; said method comprising:
    providing an opt-out database; associating opt-out status information for content with said subscriber wireless device and said content provider, the opt-out status information including at least one of blocking all messages, blocking a subset of messages based on content category,
    blocking a subset of messages based on message originator, and blocking a subset of messages based on an originating application;
    storing said opt-out status information in said opt-out database in response to a store instruction from said subscriber wireless device;
    querying said database for said opt-out status information in response to a query instruction from said content provider along with opt-out status information for a plurality of other subscriber wireless devices in a batch query;
    determining if
    a) said subscriber wireless device has opted out all content;
    b) said subscriber wireless device has opted out of content from said content provider; and
    c) said subscriber wireless device has opted to receive messages for an application from said content provider;
    notifying said content provider of said opt-out status information;
    determining a type of message for content delivery from said content provider to said subscriber wireless device, wherein the type of message is one of a plurality of types of mobile messaging available on the subscriber wireless device; and
    restricting content delivery from said content provider to said subscriber wireless device in response to said opt-out status information and the type of message, when the content category of the message is blocked, the message originator is blocked, the originating application is blocked, or all messages are blocked.

12. The method of claim 11 further comprising overriding said opt-out status information to enable said content provider to deliver content provider informational message content to said subscriber wireless device.

13. The method of claim 11, wherein said opt-out status comprises opt-in categories.

14. The method of claim 13 wherein when a message is in an opt-out content category, the process further checks the opt-in categories, that can override the opt-out content categories.

15. The method of claim 11, further comprising periodically notifying said subscriber wireless device of said stored opt-out status information.

16. The method of claim 11, further comprising generating statistics and reports based on said opt-out status information.

17. The method of claim 11, further comprising modifying said opt-out status information via said content provider or said wireless device.

18. The method of claim 11, further comprising provided secure access to said opt-out storage medium via said content provider or said wireless device.

19. The method of claim 11, wherein said content delivery is at least one of content delivery initiated by said content provider and an initial content delivery from said content provider.

20. An opt-out registry system for restricting content delivery from a content provider to a subscriber wireless device, comprising:
an opt-out database;
a centralized processor associated with said opt-out database and configured to:
store opt-out status information for content associated with said content provider and said subscriber wireless device in said opt-out database, the opt-out status information including a content category;
query said opt-out database for said opt-out status information along with opt-out status information for a plurality of other subscriber wireless devices in a batch query;
determine if
a) said subscriber wireless device has opted out all content;
b) said subscriber wireless device has opted out of content from said content provider; and
c) said subscriber wireless device has opted to receive messages for an application from said content provider;
determine a type of message for content delivery from said content provider to said subscriber wireless device, wherein the type of message is chosen from a plurality of types of mobile messaging available on the subscriber wireless device; and
restrict content delivery from said content provider to said subscriber wireless device in response to said opt-out status information and the type of message and the content category;
wherein the subscriber is periodically made aware of the opt-out status information associated with the subscriber wireless device.

21. The system of claim 20, wherein said processor is also configured to override said opt-out status information to enable said content provider to deliver content provider informational message content to said subscriber wireless device.

22. The system of claim 20, wherein said opt-out status further comprises opt-in categories.

23. The system of claim 20, wherein said opt-out content categories include "none", "opt-out of all applications", "opt-out of certain applications", "opt-out of all content providers", "opt-out of certain content providers".

24. The system of claim 20, wherein the opt-out category may be overridden by an opt-in category, such that a subset of the messages in the opt-out category are delivered.

25. The system of claim 20, wherein said processor is also configured to generate statistics and reports based on said opt-out status information.

26. The system of claim 20, wherein said processor is also configured to modify said opt-out status information via said content provider or said wireless device.

27. The system of claim 20, wherein said processor is also configured to provide secure access to said opt-out storage medium via said content provider or said wireless device.

28. An opt-out registry system for restricting content delivery from a content provider to a subscriber wireless device, comprising:
an opt-out database;
a centralized processor associated with said opt-out database and configured to:
associate opt-out status information for content with said subscriber wireless device and said content provider, the opt-out status information enabling a user to opt out of all messages except for messages in one or more opt-in categories;
store said opt-out status information in said opt-out database in response to a store instruction from said subscriber wireless device;
query said opt-out database for said opt-out status information in response to a query instruction from said content provider along with opt-out status information for a plurality of other subscriber wireless devices in a batch query;
determine if
a) said subscriber wireless device has opted out all content;
b) said subscriber wireless device has opted out of content from said content provider; and
c) said subscriber wireless device has opted to receive messages for an application from said content provider;
determine a type of message for content delivery from said content provider to said subscriber wireless device, wherein the type of message is indicated by the query, and chosen from a plurality of types of mobile messaging formats available on the subscriber wireless device; and
notify said content provider of said opt-out status information based on one or more of: the content provider, the type of message, and message content;
restrict content delivery from said content provider to said subscriber wireless device in response to said opt-out status information including the opt-in categories.

29. The system of claim 28, wherein said processor is also configured to override said opt-out status information to enable said content provider to deliver content provider informational message content to said subscriber wireless device.

30. The system of claim 28, wherein said opt-out status comprises preferences including opt-out content categories and wherein said content delivery from said content provider to said subscriber wireless device is restricted based on said opt-out content categories.

31. The system of claim 30, wherein said opt-out content categories include "none", "opt-out of all applications", "opt-out of certain applications", "opt-out of all content providers", "opt-out of certain content providers".

32. The system of claim 28, wherein said processor is also configured to periodically notify said subscriber wireless device of said stored opt-out status information.

33. The system of claim 28, wherein said processor is also configured to generate statistics and reports based on said opt-out status information.

34. The system of claim 28, wherein said processor is also configured to modify said opt-out status information via said content provider or said wireless device.

35. The system of claim 28, wherein said processor is also configured to provide secure access to said opt-out storage medium via said content provider or said wireless device.

36. An opt-out registry system for wireless subscribers, comprising:
 a plurality of content providers;
 a plurality of subscriber wireless devices;
 an opt-out database;
 a centralized processor associated with said plurality of content providers, said plurality of subscriber wireless devices and said opt-out database; said processor configured to:
  associate opt-out status information for content with each of said plurality of subscriber wireless devices wherein said opt-out status comprises preferences including opt-out content categories;
  store said associated opt-out status information in said opt-out database in response to store requests from said plurality of subscriber wireless devices;
  determine a type of message for content delivery from one of said plurality of content provider to one of said plurality of subscriber wireless devices, wherein the type of message is chosen from a plurality of types of mobile messaging; and
  query said database for said opt-out status information in response to query requests from said plurality of content providers in a batch query comprising identification of said plurality of subscriber wireless devices, the query including the type of message;
  determine if
   a) said one of plurality of subscriber wireless devices has opted out all content;
   b) said one of plurality of subscriber wireless devices has opted out of content from said one of plurality of content providers; and
   c) said one of plurality of subscriber wireless devices has opted to receive messages for an application from one of said plurality of content providers;
  notify said plurality of content providers of said opt out status information;
  restrict content distribution from said plurality of content providers to said plurality of subscriber wireless devices in response to said opt-out status information including said opt-out content categories; and
  periodically notify said subscriber wireless device of said stored opt-out status information.

37. The system of claim 36, wherein said processor is also configured to override said opt-out status information to enable said content provider to deliver content provider informational message content to said subscriber wireless device.

38. The system of claim 36, wherein said opt-out status comprises opt-in categories, to enable delivery of a subset of messages that otherwise are in the opt-out content categories.

39. The system of claim 36, wherein said opt-out content categories include "none", "opt-out of all applications", "opt-out of certain applications", "opt-out of all content providers", "opt-out of certain content providers".

40. The system of claim 39, wherein one or more of the opt-out content categories include an opt-in sub-category that overrides the opt-out content category.

41. The system of claim 36, wherein said processor is also configured to generate statistics and reports based on said opt-out status information.

42. The system of claim 36, wherein said processor is also configured to modify said opt-out status, information via said content provider or said wireless device.

43. The system of claim 36, wherein said processor is also configured to provide secure access to said opt-out storage medium via said content provider or said wireless device.

* * * * *